United States Patent
Otomitsu

(10) Patent No.: US 12,264,242 B2
(45) Date of Patent: Apr. 1, 2025

(54) RESIN COMPOSITION FOR OPTICAL COMMUNICATION COMPONENT AND OPTICAL COMMUNICATION COMPONENT USING THE RESIN COMPOSITION

(71) Applicant: Fujikura Ltd., Tokyo (JP)

(72) Inventor: Takahito Otomitsu, Tokyo (JP)

(73) Assignee: Fujikura Ltd., Tokyo (JP)

( * ) Notice: Subject to any disclaimer, the term of this patent is extended or adjusted under 35 U.S.C. 154(b) by 56 days.

(21) Appl. No.: 17/613,997

(22) PCT Filed: Jul. 31, 2020

(86) PCT No.: PCT/JP2020/029391
§ 371 (c)(1),
(2) Date: Nov. 24, 2021

(87) PCT Pub. No.: WO2021/024932
PCT Pub. Date: Feb. 11, 2021

(65) Prior Publication Data
US 2022/0220297 A1    Jul. 14, 2022

(30) Foreign Application Priority Data

Aug. 7, 2019    (JP) .................... 2019-145155

(51) Int. Cl.
| | |
|---|---|
| C08L 61/16 | (2006.01) |
| C08K 3/36 | (2006.01) |
| C08L 71/00 | (2006.01) |
| C08L 81/02 | (2006.01) |
| C08L 81/06 | (2006.01) |
| G02B 6/38 | (2006.01) |
| G02B 6/40 | (2006.01) |

(52) U.S. Cl.
CPC ............... *C08L 61/16* (2013.01); *C08K 3/36* (2013.01); *C08L 71/00* (2013.01); *C08L 81/02* (2013.01); *C08L 81/06* (2013.01); *C08G 2650/40* (2013.01); *C08L 2203/20* (2013.01); *G02B 6/3873* (2013.01); *G02B 6/403* (2013.01)

(58) Field of Classification Search
CPC .......... C08L 61/16; C08L 71/00; C08L 81/02; C08L 81/06; C08L 2203/20; C08K 3/36; C08G 2650/40; G02B 6/3873; G02B 6/403
See application file for complete search history.

(56) References Cited

U.S. PATENT DOCUMENTS

| | | | | |
|---|---|---|---|---|
| 5,071,223 A | * | 12/1991 | Gotoh | H05K 1/0274 385/14 |
| 2004/0152831 A1 | | 8/2004 | Okuyama | |
| 2014/0364533 A1 | * | 12/2014 | Yamagawa | A61L 27/446 523/115 |
| 2020/0377681 A1 | * | 12/2020 | Hayashi | C08J 5/243 |

FOREIGN PATENT DOCUMENTS

| | | |
|---|---|---|
| CN | 1292019 A | 4/2001 |
| CN | 102977549 A | 3/2013 |
| CN | 103435947 A | 12/2013 |
| CN | 107767989 A | 3/2018 |
| CN | 108135678 A | 6/2018 |
| EP | 3075756 A1 | 10/2016 |
| JP | H03217278 * | 9/1991 |
| JP | 2000001615 A | 1/2000 |
| JP | 2000-273304 A | 10/2000 |
| JP | 2004029415 A | 1/2004 |
| JP | 2012-516022 A | 7/2012 |
| WO | 2017/073572 A1 | 5/2017 |
| WO | 2019042948 A1 | 3/2019 |

OTHER PUBLICATIONS

Machine English translation of H03217278, Kobayashi et al., Sep. 25, 1991.*
International Search Report issued in corresponding International Application No. PCT/JP2020/029391 mailed Oct. 13, 2020 (5 pages).
Written Opinion issued in corresponding International Application No. PCT/JP2020/029391 mailed Oct. 13, 2020 (3 pages).

* cited by examiner

*Primary Examiner* — Patrick D Niland
(74) *Attorney, Agent, or Firm* — Osha Bergman Watanabe & Burton LLP

(57) ABSTRACT

A resin composition for an optical communication component includes a base resin and silica. The base resin contains a polyether ether ketone resin as a main component. The content of the silica in the resin composition is 55 to 75 mass %.

3 Claims, 1 Drawing Sheet

RESIN COMPOSITION FOR OPTICAL COMMUNICATION COMPONENT AND OPTICAL COMMUNICATION COMPONENT USING THE RESIN COMPOSITION

TECHNICAL FIELD

The present invention relates to a resin composition for an optical communication component and an optical communication component using the resin composition.

BACKGROUND

Optical communication components such as an optical connector ferrule and a sleeve are generally composed of a resin composition containing a resin and an inorganic filler. In addition, the optical communication components are required to have high dimensional accuracy. For this reason, the resin composition constituting the optical communication component is required to be easily molded and to impart good dimensional accuracy to the optical communication component. As a resin composition constituting such an optical communication component, it has been conventionally proposed to use a PPS resin composition composed of 20 to 35 wt % of a polyphenylene sulfide resin (PPS resin) and 80 to 65 wt % of a filler (see, for example, Patent Literature 1 below).

Patent Literature 1: JP 2000-273304 A

SUMMARY

In recent years, there has been an increasing demand for performing solder reflow in a state where an optical communication component such as an optical connector ferrule is mounted on a circuit board.

The resin composition for an optical communication component described in above Patent Literature 1 can be easily molded to an optical communication component and can impart good dimensional accuracy to the optical communication component.

When solder reflow is performed in a state where an optical communication component composed of the resin composition for an optical communication component described in above Patent Literature 1 is mounted on a circuit board, thermal deformation may occur.

One or more embodiments of the present invention relate to a resin composition for an optical communication component that can be easily molded to an optical communication component, can impart good dimensional accuracy to the optical communication component, and can sufficiently suppress thermal deformation of the optical communication component even when the optical communication component is heated at a solder reflow temperature. One or more embodiments of the present invention relate to an optical communication component comprising the resin composition.

The present inventor has studied the aforementioned PPS resin as related to optical communication components. First, the solder reflow temperature is usually about 260° C., whereas the melting point of the PPS resin is about 280° C. Therefore, the present inventor has considered that the PPS resin should not be melted even when the optical connector ferrule containing the PPS resin is heated at a solder reflow temperature. However, as a result of close examination by the present inventor, it has been found that melting of crystal partially occurs at around 260° C. in the PPS resin. For this reason, the present inventor has found that the ferrule is deformed due to the partial melting of the crystal of the PPS resin of the optical connector ferrule when heated at a reflow temperature. Therefore, the present inventor has considered using an epoxy resin or a polyimide resin having higher heat resistance than the PPS resin instead of the PPS resin. However, these resins have a long molding cycle, poor productivity, and high hygroscopicity, and may swell the optical connector ferrule due to moisture absorption in long-term use. Therefore, as a result of further intensive studies, the present inventor has considered that it is effective to use a polyether ether ketone resin (PEEK resin), which has low hygroscopicity and does not substantially melt near the solder reflow temperature, instead of the PPS resin. However, there is a case where good dimensional accuracy cannot be imparted to the ferrule only by changing the PPS resin to the PEEK resin.

One or more embodiments of the present invention relate to a resin composition for an optical communication component containing a base resin containing a PEEK resin as a main component, and silica, in which the content of the silica in the resin composition for an optical communication component is 55 to 75 mass %.

In one or more embodiments, the resin composition for an optical communication component can be easily molded to an optical communication component, can impart good dimensional accuracy to the optical communication component, and can sufficiently suppress thermal deformation of the optical communication component even when the optical communication component is HEATED AT A SOLDER REFLOW TEMPERATURE.

In the resin composition for an optical communication component, according to one or more embodiments, the base resin further contains at least one type of resin selected from the group consisting of a polyarylene sulfide (PAS) resin, a polyethersulfone resin (PES), a polyetherimide (PEI) resin, and a liquid crystalline resin (LCP) having a melting point of 300° C. or higher.

In this case, since the resin described above usually has a lower melt viscosity than the PEEK resin during molding, the fluidity of the resin composition for an optical communication component can be further enhanced as compared with the case where the base resin does not contain the resin described above, and the optical communication component can be more easily molded. In addition, the resin described above has a lower melting point than the PEEK resin, but generally has a high melting point because of having high crystallinity, has a low linear expansion coefficient, and has low hygroscopicity, so that good dimensional accuracy is imparted to the optical communication component, and thermal deformation of the optical communication component can be more sufficiently suppressed as compared with a case where a resin other than the resin described above is used when the optical communication component is heated at a solder reflow temperature.

In the resin composition for an optical communication component, according to one or more embodiments, the base resin further contains the PAS resin.

In the resin composition for an optical communication component, according to one or more embodiments, the PAS resin is a PPS resin.

In the resin composition for an optical communication component, according to one or more embodiments, the content of the PPS resin in the base resin is 20 mass % or less.

In this case, as compared with the case where the content of the PPS resin in the base resin exceeds 20 mass %, thermal deformation of the optical communication component can be more sufficiently suppressed even when the optical communication component is heated at a solder reflow temperature.

In the resin composition for an optical communication component, according to one or more embodiments, the PEEK resin has a melt volume rate (melt volume rate conditions: resin temperature 380° C., load 5 kg, compliant with ISO 1133) of 100 cm³/10 minutes or more.

In this case, the optical communication component can be more easily molded as compared with the case where the melt volume rate (MVR) of the PEEK resin is less than 100 cm³/10 minutes.

In addition, one or more embodiments of the present invention relate to an optical communication component containing the resin composition for an optical communication component described above.

In one or more embodiments of the present invention, the optical communication component contains the resin composition for an optical communication component described above, and the resin composition for an optical communication component described above can be easily molded to an optical communication component, can impart good dimensional accuracy to the optical communication component, and can sufficiently suppress thermal deformation of the optical communication component even when the optical communication component is heated at a solder reflow temperature. Therefore, in one or more embodiments, the optical communication component has good appearance and dimensional accuracy, and can sufficiently suppress thermal deformation even when heated at a solder reflow temperature.

According to one or more embodiments of the present invention, there are provided a resin composition for an optical communication component that can be easily molded to an optical communication component, can impart good dimensional accuracy to the optical communication component, and can sufficiently suppress thermal deformation of the optical communication component even when the optical communication component is heated at a solder reflow temperature, and an optical communication component using the same.

DETAILED DESCRIPTION

Figure 1:
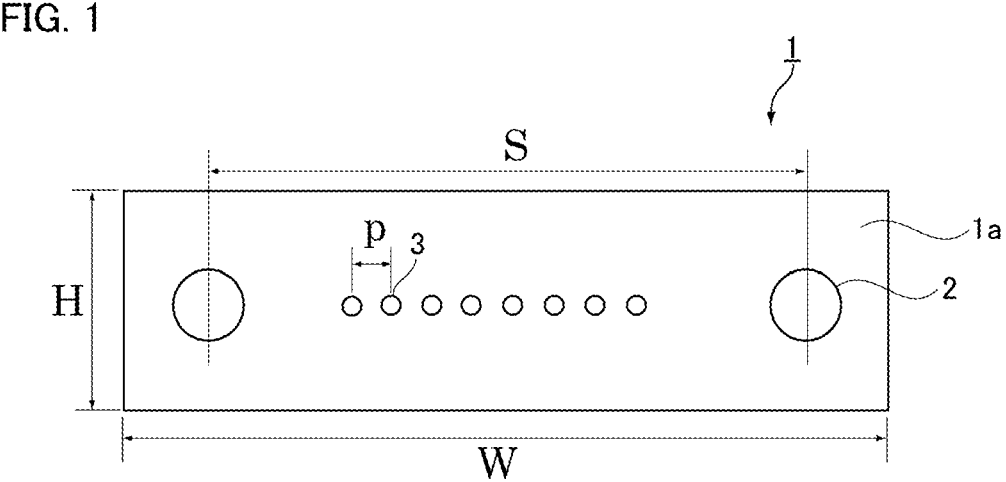
FIG. 1 is an end view illustrating an MT ferrule as an optical communication component, according to one or more embodiments.

Hereinafter, embodiments of the present invention will be described in detail.

<Resin Composition for Optical Communication Component>

The resin composition for an optical communication component, according to one or more embodiments of the present invention, contains a base resin containing a PEEK resin as a main component, and silica. The content of the silica in the resin composition for an optical communication component is 55 to 75 mass %.

The resin composition for an optical communication component, according to one or more embodiments of the present invention, can be easily molded to an optical communication component, can impart good dimensional accuracy to the optical communication component, and can sufficiently suppress thermal deformation of the optical communication component even when the optical communication component is heated at a solder reflow temperature.

Hereinafter, the resin composition will be described in detail.

(Base Resin)

The base resin contains a PEEK resin as a main component. Here, the main component refers to a component whose content in the base resin is 50 mass % or more.

The PEEK resin has a repeating unit represented by Structural Formula (1) described below.

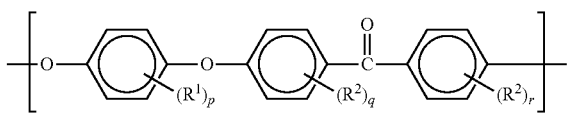

(1)

In Structural Formula (1) described above, $R^1$, $R^2$, and $R^3$ are all substituents, and p, q, and r are each an integer of 0 to 4. Examples of the substituent include substituents such as a halogen group, an alkyl group, an alkenyl group, and an aryl group. It is preferable that p, q, and r are each 0.

The PEEK resin has n repeating units. n is a positive integer representing the average polymerization degree.

The MVR of the PEEK resin is not particularly limited, but is preferably 100 cm³/10 minutes or more. In this case, the optical communication component can be more easily molded as compared with the case where the resin composition for an optical communication component has an MVR of less than 100 cm³/10 minutes.

The MVR of the PEEK resin is more preferably 150 cm³/10 minutes or more, and particularly preferably 200 cm³/10 minutes or more.

However, the MVR of the PEEK resin is preferably 500 cm³/10 minutes or less. In this case, the melting point of the PEEK resin is higher than that in a case where the MVR of the PEEK resin exceeds 500 cm³/10 minutes, and thermal deformation of the optical communication component can be more sufficiently suppressed in a case where the optical communication component is heated at a solder reflow temperature. Additionally, the strength of the optical communication component is further improved.

The base resin may be composed of only the PEEK resin, or may be composed of a mixed resin of the PEEK resin and a different resin.

The different resin is preferably a PAS resin, a PES resin, a PEI resin, LCP having a melting point of 300° C. or higher, or a combination of two or more thereof.

In this case, since the different resin usually has a lower melt viscosity than the PEEK resin during molding, the fluidity of the resin composition for an optical communication component can be further enhanced as compared with the case where the base resin does not further contain the different resin, and the optical communication component can be more easily molded. In addition, the different resin has a lower melting point than the PEEK resin, but generally has a high melting point because of having high crystallinity, has a low linear expansion coefficient, and has low hygroscopicity, so that good dimensional accuracy is imparted to the optical communication component, and thermal deformation of the optical communication component can be more sufficiently suppressed as compared with a case where a resin other than the different resin is used when the optical communication component is heated at a solder reflow temperature.

Among them, the PAS resin is preferable as the different resin. The PAS resin is a polymer containing 80 mol % or more of the repeating unit represented by structural formula [—Ar—S—] (where Ar is an arylene group and S is sulfur). Among the PAS resins, a PPS resin having the repeating unit represented by structural formula [-Ph-S—] (where Ph is a para-phenylene group, and S is sulfur) is preferable.

Furthermore, the PPS resin preferably contains the repeating unit in an amount of 80 mol % or more, more preferably 90 mol % or more. In this case, the crystallinity and melting point of the PPS resin are higher as compared with the case where the repeating unit of the PPS resin is less than 80 mol %, and the impairment of the heat resistant deformability during solder reflow is more sufficiently suppressed even when the PPS resin is blended in the PEEK resin.

The content of the PPS resin in the base resin is preferably 20 mass % or less. In this case, as compared with a case where the content of the PPS resin in the base resin exceeds 20 mass %, thermal deformation of the optical communication component can be more sufficiently suppressed as compared with a case where a resin other than the PPS resin is used when the optical communication component is heated at a solder reflow temperature.

The content of the PPS resin in the base resin is further preferably 10 mass % or less. As compared with the case where the content of the PPS resin in the base resin exceeds 10 mass %, a part of the PPS resin is less likely to melt due to high temperature during the solder reflow, and thermal deformation of the optical communication component, which is a molded article, can be more sufficiently suppressed.

However, the content of the PPS resin in the base resin is more preferably 2 mass % or more. In this case, since the fluidity of the resin composition for an optical communication component can be further enhanced, molding of the resin composition for an optical communication component becomes easy. However, when the MVR of the PEEK resin is sufficiently high, it is not necessarily needed to blend the PPS resin. That is, when the MVR of the PEEK resin is sufficiently high, the content of the PPS resin in the base resin may be 0 mass %.

The content of the base resin in the resin composition for an optical communication component is preferably 25 to 45 mass %.

In this case, as compared with the case where the content of the base resin in the resin composition for an optical communication component is less than 25 mass %, the fluidity of the resin composition for an optical communication component becomes higher, and the optical communication component can be more easily molded. In addition, as compared with the case where the content of the base resin in the resin composition for an optical communication component exceeds 45 mass %, better dimensional accuracy can be imparted to the optical communication component.

The content of the base resin in the resin composition for an optical communication component is more preferably 27 mass % or more, and particularly preferably 29 mass % or more.

However, the content of the base resin in the resin composition for an optical communication component is more preferably 42 mass % or less, and particularly preferably 40 mass % or less.

(Silica)

Examples of the silica used in one or more embodiments of the present invention include amorphous silica (fused silica) and crystalline silica (quartz, cristobalite, or the like).

The silica may be either amorphous silica or crystalline silica, but amorphous silica is suitable as the silica used in the present invention. In this case, since amorphous silica has lower hardness than crystalline silica, it is possible to more sufficiently suppress damage to equipment used for molding the resin composition for an optical communication component.

In addition, the shape of silica may be spherical or pulverized and amorphous, but is preferably spherical. In this case, the fluidity of the material in the case of being blended in the base resin is higher and the dimensional accuracy of a molded article is further improved as compared with the case where pulverized and amorphous silica is used instead of spherical silica.

When the shape of the silica is spherical, the silica is particularly preferably formed by a melting method.

The sphericity of silica is generally represented by circularity, and the circularity is preferably 0.80 or more. In this case, an optical communication component having a lower anisotropy of the linear expansion coefficient can be molded. The circularity is more preferably 0.85 or more, and particularly preferably 0.90 or more. Here, the circularity of silica is defined by Formula (2) described below from the perimeter of each projection image of silica particles taken and the perimeter of the equivalent circle of the projection image.

$$\text{(Circularity)} = \text{(Perimeter of equivalent circle)} / \text{(Perimeter of particle projection image)} \quad (2)$$

Specifically, the circularity is measured using flow type particle image analyzer FPIA-1000 manufactured by Sysmex Corporation, and the average value of the measurement values is obtained as the circularity. Usually, the number of sampled particles is about 200.

Note that, in Formula (2) described above, the "equivalent circle" represents a virtual circle having the same area as the projection image of the silica particle to be measured, and when the particle is completely spherical, the projection image also becomes a perfect circle and the circularity is 1. When the perimeter of one particle projection image is L and the area is S, the circularity can be calculated by the formula described below.

$$\text{Circularity} = 4\Pi S/L^2$$

The average particle size of silica is not particularly limited, but is preferably 1 μm or more. In this case, as compared with the case where the average particle size of silica is less than 1 μm, the resin composition for an optical communication component has higher fluidity and better moldability, and the dimensional accuracy of a molded article obtained by molding the resin composition for an optical communication component is further improved.

However, the average particle size of silica is preferably 30 μm or less. In this case, the mechanical strength and dimensional accuracy of the resin composition for an optical communication component can be improved as compared with the case where the average particle size of silica exceeds 30 μm.

Note that the average particle size is a value measured by a laser diffraction scattering particle size distribution measuring apparatus.

The content of the silica in the resin composition for an optical communication component is 55 to 75 mass %. In this case, better dimensional accuracy can be imparted to the optical communication component as compared with the case where the content of silica in the resin composition for an optical communication component is less than 55 mass %. In addition, as compared with the case where the content of the silica in the resin composition for an optical communication component exceeds 75 mass %, the fluidity of the resin composition for an optical communication component becomes higher, and the optical communication component can be more easily molded.

The content of silica in the resin composition for an optical communication component is preferably 73 mass % or less, and particularly preferably 71 mass % or less.

However, the content of silica in the resin composition for an optical communication component is more preferably 58 mass % or more, and particularly preferably 60 mass % or more.

(Other Components)

The resin composition for an optical communication component, according to one or more embodiments of the present invention, may further contain other components as necessary in addition to the base resin and the silica. Examples of the other components include antioxidants, weathering agents, lubricants, plasticizers, antistatic agents, colorants, and inorganic fillers other than silica.

Examples of the inorganic filler other than silica include inorganic whiskers typified by potassium titanate, nanosilica, and nanofillers typified by carbon nanofibers (hereinafter CNFs). They can microreinforce the material to impart functions such as conductivity, surface slippage, and smoothness to the resin composition for an optical communication component.

The resin composition for an optical communication component can be obtained by powder-mixing the base resin, the silica, and the like, followed by melt-kneading. The kneading can be performed by, for example, a kneader such as a single screw extruder or a twin-screw kneading extruder.

<Optical Communication Component>

Next, the optical communication component, according to one or more embodiments of the present invention, will be described.

The optical communication component, according to one or more embodiments of the present invention, contains a resin composition in the optical communication component described above.

The resin composition for an optical communication component described above can be easily molded to an optical communication component, can impart good dimensional accuracy to the optical communication component, and can sufficiently suppress thermal deformation of the optical communication component even when the optical communication component is heated at a solder reflow temperature. Therefore, the optical communication component, according to one or more embodiments of the present invention, has good appearance and dimensional accuracy, and can sufficiently suppress thermal deformation even when heated at a solder reflow temperature.

Examples of the optical communication component include an optical connector ferrule, and a sleeve for housing the ferrule, and the like. Among them, the present invention is particularly effective for an optical connector ferrule that is required to have extremely high dimensional accuracy and may be mounted on a circuit board and subjected to solder reflow.

The optical connector of the optical connector ferrule may be an optical connector for single optical fiber or an optical connector for multi optical fibers. Examples of the ferrule include an MT ferrule, an SC ferrule, an LC ferrule, and the like.

The optical communication component can be molded, for example, by injection molding or transfer molding.

One or more embodiments of the present invention will be described below more specifically with reference to examples, but the present invention is not limited to the examples described below.

Example 1

The base resin and the silica were uniformly dry-blended at a ratio of 30:70 (mass ratio) using a Henschel mixer, and then melt-kneaded at a resin temperature of 380 to 410° C. using a twin-screw kneading extruder (product name "TEM37SS" manufactured by Toshiba Machine Co., Ltd.) to obtain pellets of the resin composition. At this time, as the base resin and the silica, specifically, those described below were used.

(1) Base Resin

As the base resin, a mixed resin obtained by mixing the PEEK resin described below and the PPS resin described below at 95:5 (mass ratio) was used.

(PEEK Resin)

As the PEEK resin, trade name "1000P" manufactured by Daicel-Evonik Ltd. was used. In this resin, p, q, and r in Structural Formula (1) described above were 0, and the MVR measured under the conditions of 380° C. and a load of 5 kg based on ISO 1133 was 150 $cm^3$/10 minutes.

(PPS Resin)

As the PPS resin, trade name "#140" manufactured by Tosoh Corporation was used.

(2) Silica

As the silica, surface-treated spherical amorphous silica (trade name: "TSS-6 vinylsilane treatment", manufactured by Tatsumori Ltd., circularity: 0.93, average particle size: 5 μm) was used.

Next, the pellets obtained as described above were put into an electric injection molding machine having a mold clamping force of 10 tons, and injection molding was performed using a ferrule molding mold under molding conditions of a resin temperature of 400 to 420° C., a mold setting temperature of 200° C., and a holding pressure of 100 MPa, so that the MT ferrule for eight optical fibers illustrated in FIG. 1 was produced such that an outer dimension (length×width) of an end surface, an interval S between two guide holes, and an interval p (lateral pitch) between adjacent fiber holes had below-indicated design values. Note that, in FIG. 1, reference numeral 1 denotes an MT ferrule, reference numeral 1a denotes an end surface of the MT ferrule, reference numeral 2 denotes a guide hole, and reference numeral 3 denotes a fiber hole.

(Design values)

Outer dimensions of end surface: 2.5 mm (H)×6.4 mm (W)
Interval S between two guide holes: 4.6 mm Lateral pitch p of fiber holes: 0.25 mm Example 2

An MT ferrule was produced in the same manner as in Example 1 except that when pellets of the resin composition were obtained, the base resin and the silica were mixed at a ratio of 40:60 (mass ratio), and pellet molding conditions were a resin temperature of 420° C., a mold setting temperature of 200° C., and a holding pressure of 100 MPa.
[Characteristic Evaluation]

The MT ferrules of Examples 1 and 2 obtained as described above were evaluated for dimensional accuracy, moldability, and thermal deformation suppressibility as described below.
(Moldability)

For the MT ferrules of Examples 1 and 2 obtained as described above, moldability was evaluated by the number of times necessary for producing the MT ferrule without "sink marks" or "voids". Note that the presence or absence of "sink marks" was determined from the appearance of the MT ferrule, and the "presence or absence of voids" was examined by X-ray inspection.
(Dimensional Precision)

The MT ferrules of Examples 1 and 2 obtained as described above were evaluated by examining differences between the outer dimensions (height H×width W) of the end surface, the interval S between the two guide holes, the interval p (lateral pitch) between the adjacent fiber holes illustrated in FIG. 1, and the design values.
(Thermal Deformation Suppressibility)

In evaluating the thermal deformation suppressibility, first, connections (see FIG. 2) in which the MT ferrules of Examples 1 and 2 obtained as described above were connected to other MT ferrules same as those of Examples 1 and 2 were prepared. In the connections, the insertion losses before and after heating at a solder reflow temperature (260° C.) were measured for each of the second and sixth optical fibers among the eight optical fibers, and the absolute value of the difference in the insertion losses before and after heating was determined. Then, the thermal deformation suppressibility was evaluated based on the average value of the differences between the absolute values of the second and sixth optical fibers. That is, when the average value of the absolute values of the differences in the insertion losses before and after heating at the solder reflow temperature (260° C.) was small, the thermal deformation suppressibility was evaluated to be large, and when the average value was large, the thermal deformation suppressibility was evaluated to be small. Note that, in FIG. 2, reference numeral 10 denotes a connection of two MT ferrules with eight optical fibers, and reference numeral 4 denotes a multi optical fiber ribbon.

Figure 2:
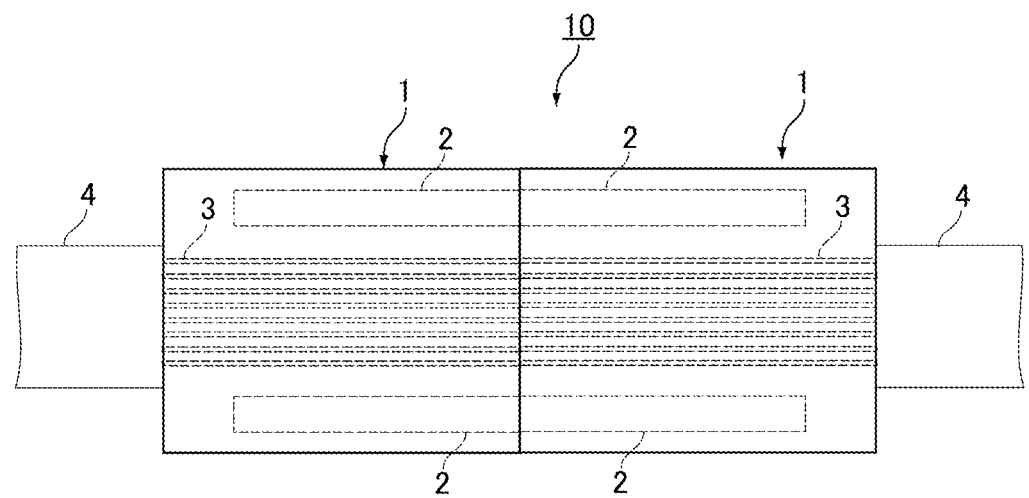
FIG. 2 is a plan view schematically illustrating a connection obtained by connecting two MT ferrules with eight optical fibers, according to one or more embodiments.

At this time, the connection of the two MT ferrules with eight optical fibers was prepared as described below. That is, as illustrated in FIG. 2, first, two MT ferrules 1 were prepared regarding each of Examples 1 and 2, eight optical fibers ribbon 4 each including eight single mode optical fibers were fixed to the respective MT ferrules 1, and the end surfaces of the two MT ferrules 1 with fibers were abutted to each other by fitting two fitting pins into the guide holes 2. Thus, the connection 10 of the two MT ferrules was prepared.

In addition, the difference in the insertion losses before and after heating at the solder reflow temperature (260° C.) measured for each of the eight optical fibers was specifically calculated as described below.
(1) First, the insertion loss before heating at the solder reflow temperature (260° C.) was measured as described below.

That is, in the connection 10 of the two MT ferrules with eight optical fibers, the insertion loss (dB) was measured by connecting a reflection attenuation measuring instrument (product name: "MBR5", manufactured by JGR, light source wavelength: 1310 nm) to the eight optical fibers of one of the MT ferrules 1. At this time, the measurement was performed twice, and the average value of the measurements performed twice was used as the measurement value. Tables 1 and 2 show results of the insertion loss (first time) B1 before heating at the solder reflow temperature, the insertion loss (second time) B2 before heating at the solder reflow temperature, which were measured as described above, and the average value B of them. Note that Table 1 shows the results of Example 1, and Table 2 shows the results of Example 2. In addition, the values of B1 and B2 are relative values when the insertion loss of the optical fiber having the smallest insertion loss among the second and sixth optical fibers is 0 dB.

(2) Next, the insertion loss after heating at the solder reflow temperature (260° C.) was measured as described below.

That is, the two MT ferrules 1 were heated at the solder reflow temperature (260° C.) for five minutes in a state of being removed from the reflection attenuation measuring instrument, and then an insertion measuring instrument was connected to the optical fiber fixed to one of the MT ferrules 1 again, and the insertion loss (dB) was measured again. At this time, the measurement was performed twice, and the average value of the measurements performed twice was used as the measurement value. Tables 1 and 2 show results of the insertion loss (first time) A1 after heating at the reflow temperature, the insertion loss (second time) A2 after heating at the reflow temperature, which were measured as described above, and the average value A of them. Note that the values A1 and A2 are also relative values when the insertion loss of the optical fiber having the smallest insertion loss among the insertion losses before heating at the solder reflow temperature in the second and sixth optical fibers is 0 dB.

(3) Finally, the absolute value of the difference between A and B calculated as described above was calculated. The results are shown in Tables 1 and 2.

TABLE 1

| | | Position of optical fiber | |
|---|---|---|---|
| | | 2ch | 6ch |
| Before heating at reflow temperature | Insertion loss (first time) B1 [dB] | 0.00 | 0.19 |
| | Insertion loss (second time) B2 [dB] | 0.15 | 0.25 |
| | Insertion loss (average) B [dB] | 0.08 | 0.22 |
| After heating at reflow temperature | Insertion loss (first time) A1 [dB] | 0.26 | 0.33 |
| | Insertion loss (second time) A2 [dB] | 0.17 | 0.25 |
| | Insertion loss (average) A [dB] | 0.22 | 0.29 |
| | |A − B| | 0.14 | 0.07 |
| Average value of |A − B| | | 0.11 | |
| Maximum value of |B2 − B1| | | 0.15 | |

TABLE 2

| | | Position of optical fiber | |
|---|---|---|---|
| | | 2ch | 6ch |
| Before heating at reflow temperature | Insertion loss (first time) B1 [dB] | 0.00 | 0.09 |
| | Insertion loss (second time) B2 [dB] | 0.09 | 0.01 |
| | Insertion loss (average) B [dB] | 0.05 | 0.05 |
| After heating at reflow temperature | Insertion loss (first time) A1 [dB] | −0.04 | −0.02 |
| | Insertion loss (second time) A2 [dB] | −0.03 | −0.10 |
| | Insertion loss (average) A [dB] | −0.04 | −0.06 |
| | |A − B| | 0.09 | 0.06 |
| Average value of |A − B| | | 0.08 | |
| Maximum value of |B2 − B1| | | 0.09 | |

Regarding moldability, in each of Examples 1 and 2, the MT ferrule having no "sink marks" or "voids" was molded at one time. Therefore, it was found that the resin compositions of Examples 1 and 2 can be easily molded.

Regarding dimensional accuracy, the outer dimensions (height H×width W) of the end surface, the interval S between the two guide holes, and the interval s (lateral pitch) between the adjacent fiber holes are as described below, and it was found that the differences from the design values were each extremely small.

Outer dimensions of end surface: 2.45 mm (H)×6.38 mm (W)

Interval S between two guide holes: 4.6006 mm

Lateral pitch p of fiber holes: 0.25 mm±0.001 mm

Regarding thermal deformation suppressibility, in Example 1, according to the results shown in Table 1, the average value of the absolute values of the differences between A and B was 0.11 dB, which was a small value. In particular, since the absolute value of the difference between B1 and B2, which were the insertion losses before heating at the reflow temperature, was 0.15 dB at the maximum, it cannot be said that the insertion loss after heating at the reflow temperature was increased as compared with that before heating, and it was found that the thermal deformation was sufficiently suppressed. In addition, in Example 2, according to the results shown in Table 2, the average value of the absolute values of the differences between A and B was 0.08 dB, which was a small value. Since the absolute value of the difference between B1 and B2, which were the insertion losses before heating at the reflow temperature, was 0.09 dB at the maximum, it cannot be said that the insertion loss after heating at the solder reflow temperature was increased as compared with that before heating, and it was found that the thermal deformation was sufficiently suppressed.

From the above, it was confirmed that the resin composition for an optical communication component, according to one or more embodiments of the present invention, can be easily molded to an optical communication component, can impart good dimensional accuracy to the optical communication component, and can sufficiently suppress thermal deformation of the optical communication component even when the optical communication component is heated at a solder reflow temperature.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:

1. A resin composition for an optical communication component comprising:
    a base resin containing a polyether ether ketone resin as a main component; and
    amorphous silica, wherein
    a content of the amorphous silica in the resin composition is 55 to 75 mass %,
    a circularity of the amorphous silica is 0.80 or more,
    the base resin contains a polyphenylene sulfide resin of 2 mass % or more and 20 mass % or less,
    a content of the base resin in the resin composition for the optical communication component is 25 to 45 mass %,
    the polyphenylene sulfide resin contains a repeating unit of phenylene sulfide in an amount of 80 mol % or more, and
    the base resin further contains at least one type of resin selected from a group consisting of a liquid crystalline resin having a melting point of 300° C. or higher, a polyarylene sulfide resin, a polyethersulfone resin, and a polyetherimide resin.

2. The resin composition according to claim 1, wherein the polyether ether ketone resin has a melt volume rate of 100 cm³/10 minutes or more when measured according to ISO 1133 with a resin temperature of 380° C. and a load of 5 kg.

3. An optical communication component comprising:
    a resin composition comprising:
        a base resin containing a polyether ether ketone resin as a main component; and
        amorphous silica, wherein
        a content of the amorphous silica in the resin composition is 55 to 75 mass %,
        a circularity of the amorphous silica is 0.80 or more, and
        the base resin contains a polyphenylene sulfide resin of 2% or more and 20% or less,
        a content of the base resin in the resin composition for the optical communication component is 25 to 45 mass %, and
        the polyphenylene sulfide resin contains a repeating unit of phenylene sulfide in an amount of 80 mol % or more.

* * * * *